US010254191B2

(12) United States Patent
Fu et al.

(10) Patent No.: US 10,254,191 B2
(45) Date of Patent: Apr. 9, 2019

(54) INCLINING TEST EQUIPMENT

(71) Applicants: BOE TECHNOLOGY GROUP CO., LTD., Beijing (CN); K-Tronics (SuZhou) Technology Co., Ltd, Suzhou, Jiangsu Province (CN)

(72) Inventors: Xiaoliang Fu, Beijing (CN); Deli Fang, Beijing (CN)

(73) Assignees: BOE TECHNOLOGY GROUP CO., LTD., Beijing (CN); K-TRONICS (SUZHOU) TECHNOLOGY CO., LTD., Suzhou, Jiangsu Province (CN)

( * ) Notice: Subject to any disclaimer, the term of this patent is extended or adjusted under 35 U.S.C. 154(b) by 629 days.

(21) Appl. No.: 14/799,770

(22) Filed: Jul. 15, 2015

(65) Prior Publication Data

US 2016/0282214 A1 Sep. 29, 2016

(30) Foreign Application Priority Data

Mar. 25, 2015 (CN) .................... 2015 2 0172320 U

(51) Int. Cl.
*G01M 1/12* (2006.01)
*F16M 11/00* (2006.01)
*F16M 11/06* (2006.01)
*F16M 11/12* (2006.01)

(52) U.S. Cl.
CPC .............. *G01M 1/12* (2013.01); *F16M 11/06* (2013.01); *F16M 11/00* (2013.01); *F16M 11/12* (2013.01)

(58) Field of Classification Search
CPC ......... G01M 1/12; F16M 11/06; F16M 11/00; F16M 11/12
USPC ............................ 73/856, 859, 865.9, 65.01
See application file for complete search history.

(56) References Cited

U.S. PATENT DOCUMENTS

RE31,993 E * 10/1985 Wesch, Jr. ............ G01M 3/022 138/90
5,829,947 A * 11/1998 Litten ...................... B60P 1/43 14/71.3
6,232,616 B1 * 5/2001 Chen ..................... G01M 11/00 250/559.45
7,535,548 B2 * 5/2009 Lee ...................... G02F 1/1303 324/760.01
2012/0073383 A1 * 3/2012 You ....................... A63B 60/42 73/847

FOREIGN PATENT DOCUMENTS

JP 2002108240 A * 4/2002

* cited by examiner

*Primary Examiner* — Justin Seo
*Assistant Examiner* — John M Royston
(74) *Attorney, Agent, or Firm* — Nath, Goldberg & Meyer; Joshua B. Goldberg

(57) ABSTRACT

The present invention belongs to the field of display technology, in particular to inclining test equipment. The inclining test equipment comprises a workbench, and further comprises an abutment and an adjusting unit provided under the workbench, the adjusting unit being arranged between the abutment and the workbench, and being connected to the workbench and the abutment respectively, and the adjusting unit being configured to adjust the angle of inclination of the workbench relative to a plane of the abutment. The inclining test equipment has high test efficiency, high accuracy, and higher safety.

19 Claims, 2 Drawing Sheets

1
22
2
3
21

INCLINING TEST EQUIPMENT

FIELD OF THE INVENTION

The present invention belongs to the field of display technology, and in particular to an inclining test equipment.

BACKGROUND OF THE INVENTION

In order to ensure the stability of a display device in a particular placement position (for example, the display device is sidelong placed relative to a placement platform, or the display device is placed on a slope platform with a certain angle), an inclining test is usually performed before the display device is delivered. An inclining test on the base of the display device is an essential test experiment during the structural development of the display device.

The inclining test is usually completed by means of inclining test equipment (or an inclining test platform). An existing inclining test platform for a display device is generally built by cooperation of lifting equipment and a flat plate, which is both manpower and material resource consuming; furthermore, the use of an angle gauge and other instruments is also needed to measure an angle of inclination. As a result, the test efficiency is low and errors of manual measurement are also inevitably caused.

SUMMARY OF THE INVENTION

In view of technical problems in the prior art, an embodiment of the present invention provides an inclining test equipment. The inclining test equipment allows high test efficiency, high accuracy, and higher safety.

The embodiment of the present invention provides an inclining test equipment, including a workbench, and further including an abutment and an adjusting unit both provided under the workbench, the adjusting unit is arranged between the abutment and the workbench, and connected to the workbench and the abutment, respectively, and the adjusting unit is configured to adjust an angle of inclination of the workbench relative to a plane of the abutment.

Optionally, at least one side of the workbench and at least one side of the abutment are arranged opposite to each other to form a hinged edge, and a groove is formed in the abutment in a direction perpendicular to the hinged edge; and the adjusting unit includes a transmission member and a supporting member, which are movably connected, the transmission member being arranged in the groove and capable of moving linearly in an extension direction of the groove.

Optionally, the transmission member includes a feed screw and a pusher connected to one end of the feed screw; and the supporting member includes a linkage movably connected to a bottom surface of the workbench and the pusher, respectively.

Optionally, the adjusting unit further includes an adjusting member which is a rocker arm fixedly connected to one end, far away from the hinged edge, of the feed screw; and the rocker arm allows bidirectional circumferential motion of the feed screw.

Optionally, a pair of workbench lugs are provided in a region, corresponding to the groove, on the bottom surface of the workbench, and a connecting pin is provided in each of the workbench lugs; and the linkage includes connecting rods, one end of each of which is movably connected to the bottom surface of the workbench through the connecting pin.

Optionally, a pair of connecting rods of the same specification are arranged opposite to each other; and one end of each of the pair of connecting rods is movably connected to the bottom surface of the workbench while the other end thereof is movably connected to the pusher.

Optionally, the transmission member further includes a roller provided in the pusher and clamped inside the pair of the connecting rods, the roller being capable of moving linearly in the extension direction of the groove.

Optionally, a fixed block is provided on a side, corresponding to the groove and far away from the hinged edge, of the abutment, and a fixed hole, through which the feed screw passes to be relatively fixedly connected to the rocker arm, is formed in the fixed block.

Optionally, the inclining test equipment further includes an angle indicating member including a plurality of angle scales arranged in parallel on a side of the groove; and a corresponding position of the pusher on the angle scales corresponds to an angle of inclination of the workbench relative to a plane of the abutment.

Optionally, the plurality of angle scales have values ranging from 5° to 20°.

in which:

1: workbench;
2: abutment;
21: hinged edge;
22: groove;
3: adjusting unit;
31: feed screw;
32: pusher;
33: workbench lugs;
34: connecting pin;
35: connecting rod;
36: roller;
37: rocker arm;
38: fixed block;
39: angle scale.

DETAILED DESCRIPTION OF THIS EMBODIMENTS

To make those skilled in the art better understand the technical solutions of the present invention, an inclining test equipment of the present invention will be further described below in detail with reference to the accompanying drawings by specific implementations.

This embodiment provides an inclining test equipment. By using a spirally propelled adjusting unit, it can be easy to accurately control the angle of inclination during the inclining test, thus to improve the test efficiency and test accuracy. Meanwhile, the spirally propelled adjusting unit is connected to a workbench supporting a display device to be tested by means of surface contact, which greatly improves the degree of stability of the display device, to be tested, supported on the workbench, and ensures the safety of the inclining test.

Figure 1:
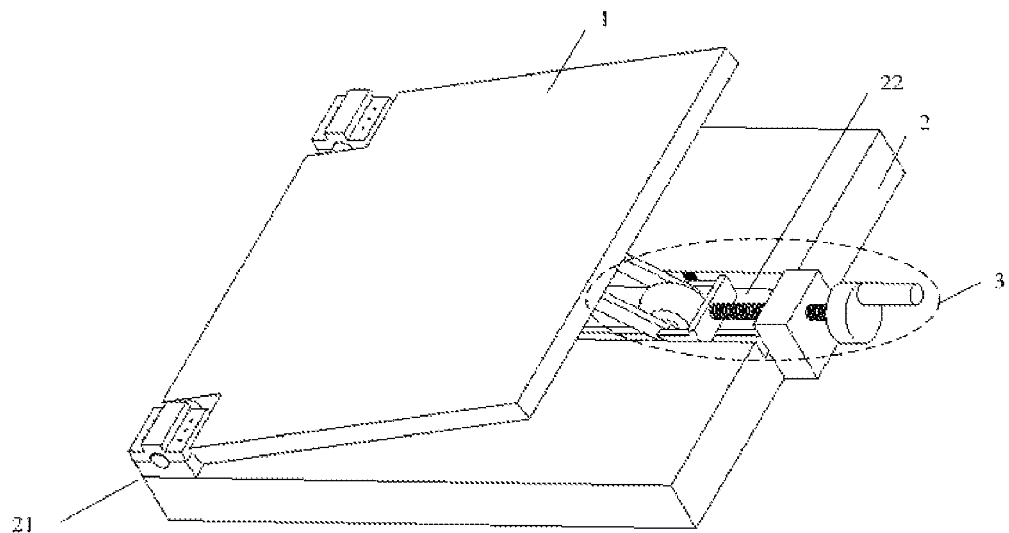
FIG. 1 is a structural schematic diagram of an inclining test equipment according to an embodiment of the present invention.

As shown in FIG. 1, the inclining test equipment includes a workbench 1, further includes an abutment 2 and an adjusting unit 3 both provided under the workbench 1, the adjusting unit 3 is arranged between the abutment 2 and the workbench 1 and connected to the workbench 1 and the abutment 2, respectively, and the adjusting unit 3 is configured to adjust an angle of inclination of the workbench 1 relative to a plane of the abutment 2.

At least one side of the workbench 1 and at least one side of the abutment 2 are arranged opposite to each other to form a hinged edge 21 together, and a groove 22 is formed in the abutment 2 in a direction perpendicular to the hinged edge 21; and the adjusting unit 3 includes a transmission member and a supporting member, which are movably connected, the transmission member being arranged in the groove 22 and capable of moving linearly in a forming direction of the groove 22, that is, the transmission member does linear motion perpendicular to the hinged edge 21.

Figure 2:
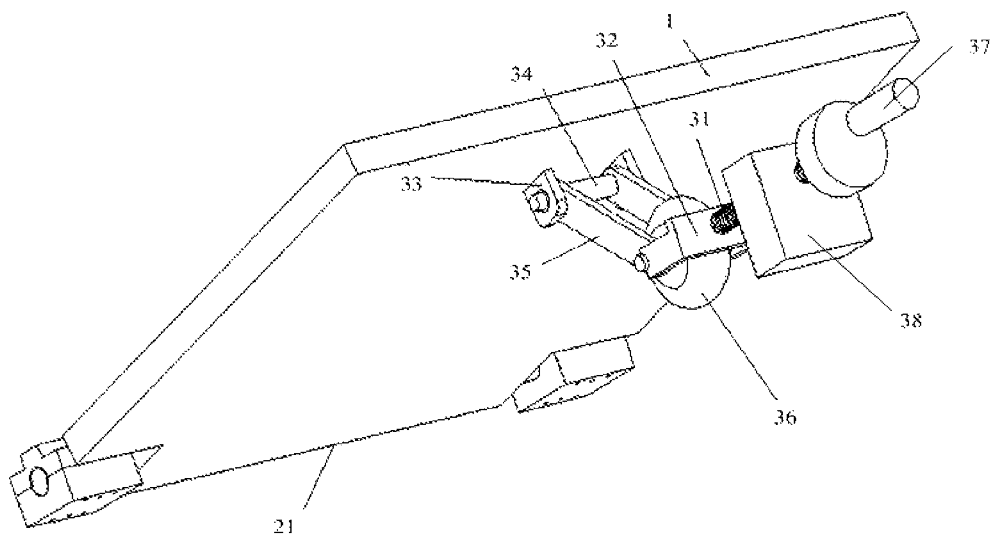
FIG. 2 is a structural schematic diagram of the inclining test equipment of FIG. 1, with the abutment removed.
Figure 3:
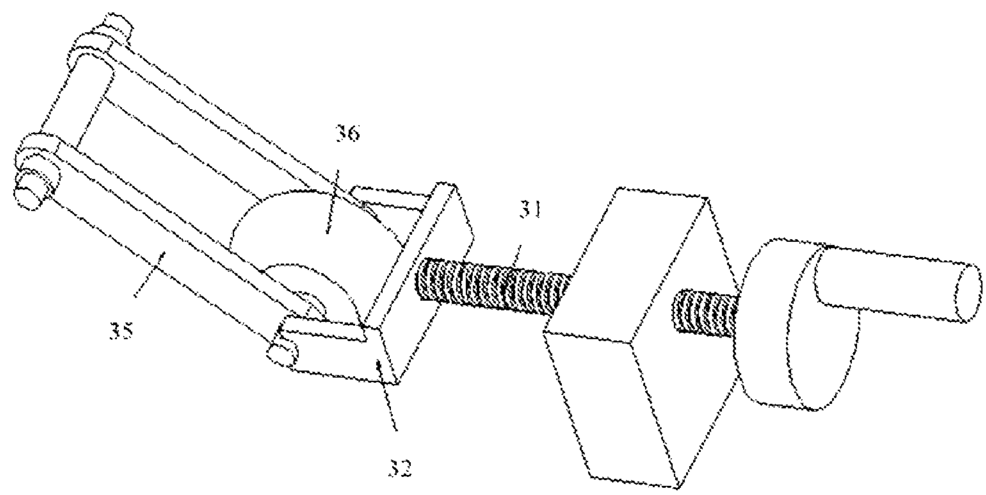
FIG. 3 is a structural schematic diagram of an adjusting unit of the inclining test equipment of FIG. 1.

As shown in FIG. 2 and FIG. 3, the transmission member includes a feed screw 31 and a pusher 32 connected to one end of the feed screw 31; and the supporting member includes a linkage movably connected to a bottom surface of the workbench 1 and the pusher 32, respectively.

In order to facilitate adjusting an angle, the adjusting unit 3 further includes an adjusting member which is a rocker arm 37 fixedly connected to one end, far away from the hinged edge 21, of the feed screw 31, and the rocker arm 37 can allow bidirectional circumferential motion of the feed screw 31.

Referring to FIG. 2, a pair of workbench lugs 33 is provided in a region, corresponding to the groove 22, on the bottom surface of the workbench 1, and a connecting pin 34 is provided in each of the workbench lugs 33; and the linkage includes connecting rods 35, one end of each of which is movably connected to a bottom surface of the workbench 1.

Optionally, a pair of connecting rods 35 of a same specification is arranged opposite to each other; and one end of each of the pair of connecting rods is movably connected to the bottom surface of the workbench 1 while the other end thereof is movably connected to the pusher 32. The two connecting rods 35 and the workbench 1 are connected to each other by means of surface contact, so that the workbench 1 supports the display device more steadily during an adjustment of the angle of inclination and during the test after placing the display device to be tested on the workbench.

In order to further improve the propelling efficiency of the spirally propelled adjusting unit, the transmission member further includes a roller 36 arranged in the pusher 32 and clamped inside the pair of the connecting rods, the roller 36 being capable of moving linearly in the forming direction of the groove 22. The work made by increasing the angle of inclination by the workbench 1 can be reduced by means of the roller-linkage, thus improving the test efficiency.

For example, when the workbench 1 is lifted to increase the angle of inclination, the rocker arm 37 does clockwise circumferential motion, the feed screw 31 drives the pusher 32 and the roller 36 to move forward and meanwhile the connecting rod drives the workbench 1 to be lifted slowly and stably; when the workbench 1 falls down to reduce the angle of inclination, the rocker arm 37 does anticlockwise circumferential motion, and the feed screw 31 moves backward, the workbench 1 slowly falls down due to the gravity of the workbench 1 itself.

In the inclining test equipment in this embodiment, a fixed block 38 is arranged on a side, corresponding to the groove 22 and far away from the hinged edge 21, of the abutment 2, and a fixed hole, through which the feed screw 31 passes to be relatively fixedly connected to the rocker arm 37, is formed in the fixed block 38. The fixed block 38 limits the whole adjusting unit 3, and keeps a relatively stable position relationship between the adjusting unit 3 and the abutment 2. Herein, the fixed block 38 may be integrated with the abutment 2; or, the fixed block 38 is a separated structure (for example, a structure as shown in FIG. 3), and the fixed block 38 is detachably fixed on the abutment 2.

Figure 4:
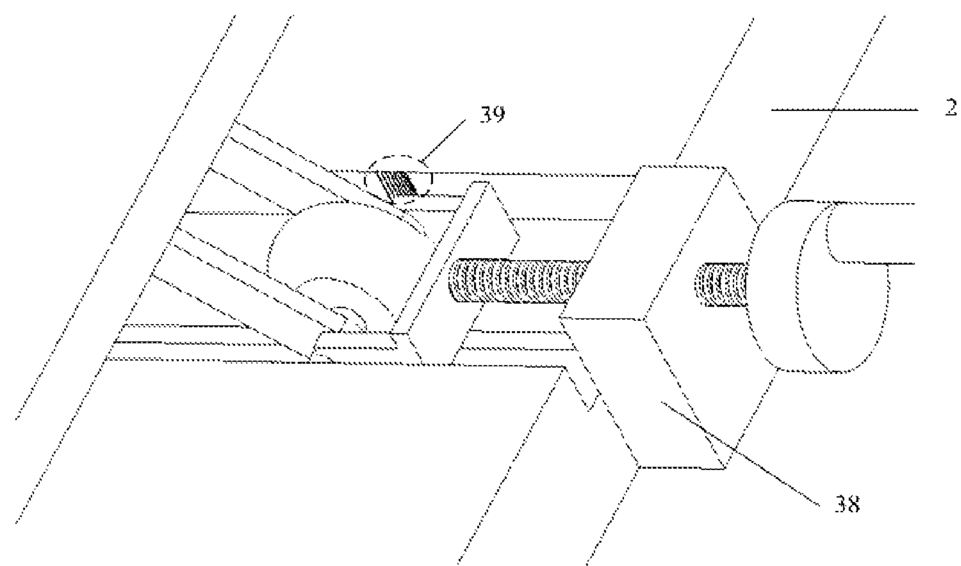
FIG. 4 is a partially structural schematic diagram of the inclining test equipment of FIG. 1, including angle scales.

As shown in FIG. 4, the inclining test equipment further includes an angle indicating member including a plurality of angle scales 39 arranged in parallel on a side of the groove 22, an angle of inclination of the workbench 1 relative to a plane of the abutment 2 is marked at a corresponding scale of the angle scales 39. During the manufacture of the inclining test equipment, the distribution of the angle scales 39 may be determined by different angles of inclination of the workbench 1 and the corresponding position of the pusher 32, which will not be repeated here.

In this way, during the spiral propelling by the adjusting unit 3, the angle of inclination of the workbench 1 may be adjusted by the angle value marked by the angle scales 39 on the abutment 2, so as to omit an angle gauge required by the use of an existing inclining test platform and thus to avoid the errors of manual measurement.

Optionally, the plurality of angle scales 39 have values ranging from 5° to 20°. For example, according to an object to be tested by the inclining test equipment, or according to different inclining test standards from customers, the angle scales 39 have values ranging from 7° to 15°.

The workbench 1 of the inclining test equipment in this embodiment is a square bedplate, and may be designed as other shapes according to test requirements. The workbench 1 may be formed of material that can bear the weight of products to be tested, for example, formed of cast iron material. Meanwhile, according to a specific test occasion of the workbench 1, the surface may be processed by using insulating material according to requirements; and an appropriate roughness of the surface may be set, which will not be limited here.

It should be understood that, the inclining test equipment in this embodiment is exemplified by an inclining test which is suitable for a display device. However, the inclining test equipment of the present invention is not limited to the inclining tests applicable to display devices. Instead, it may be widely applied to other products to be tested which need an inclining test during practical production.

For the inclining test equipment in this embodiment, by using a spirally propelled adjusting unit, it can be easy to accurately control the angle of inclination during the inclining test, thus to improve the test efficiency and test accuracy and to save manpower and material resource. Meanwhile, the spirally propelled adjusting unit is connected to a workbench supporting a display device to be tested by means of surface contact, which greatly improves the degree of stability of the display device, to be tested, supported on the workbench, and ensures the safety of the inclining test.

It may be understood that, the above implementations are exemplary implementations merely used to describe the principle of the present invention, and the present invention is not limited thereto. For a person of ordinary skill in the art, various variations and improvements may be made without departing from the spirit and essence of the present invention, and those variations and improvements should also be regarded as falling into the protection scope of the present invention.

The invention claimed is:

1. An inclining test equipment, comprising a workbench configured to support a display device to be tested on a first surface, and an abutment configured to function as a placement platform and an adjusting unit both provided under the workbench, wherein the adjusting unit is arranged between the abutment and a second surface of the workbench, and connected to both the workbench and the abutment, and an angle of inclination of the workbench relative to a plane of the abutment is adjustable by the adjusting unit, wherein the first surface is opposite to the second surface, wherein at least one side of the workbench and at least one side of the abutment are arranged opposite to each other to form a hinged edge together, and a groove is formed in the abutment in a direction perpendicular to the hinged edge; and the adjusting unit comprises a transmission member and a supporting member, which are movably connected to each other, the transmission member being arranged in the groove and capable of moving linearly in an extension direction of the groove.

2. The inclining test equipment according to claim 1, wherein the transmission member comprises a feed screw and a pusher connected to one end of the feed screw; and the supporting member comprises a linkage movably connected to a bottom surface of the workbench and the pusher, respectively.

3. The inclining test equipment according to claim 2, wherein the adjusting unit further comprises an adjusting member which is a rocker arm fixedly connected to one end, away from the hinged edge, of the feed screw; and the rocker arm allows bidirectional circumferential motion of the feed screw.

4. The inclining test equipment according to claim 2, wherein a pair of workbench lugs are provided in a region, corresponding to the groove, on the bottom surface of the workbench, and a connecting pin is provided in each of the workbench lugs; and the linkage comprises connecting rods, one end of each of which is movably connected to the bottom surface of the workbench through the connecting pin.

5. The inclining test equipment according to claim 4, wherein the connecting rods are a pair of connecting rods of the same specification, which are arranged opposite to each other; and one end of each of the pair of connecting rods is movably connected to the bottom surface of the workbench while the other end thereof is movably connected to the pusher.

6. The inclining test equipment according to claim 5, wherein the transmission member further comprises a roller arranged in the pusher and clamped inside the pair of the connecting rods, the roller being capable of moving linearly in the extension direction of the groove.

7. The inclining test equipment according to claim 2, wherein a fixed block is provided on a side, corresponding to the groove and away from the hinged edge, of the abutment, and a fixed hole, through which the feed screw passes to be relatively fixedly connected to the rocker arm, is formed in the fixed block.

8. The inclining test equipment according to claim 3, wherein a fixed block is provided on a side, corresponding to the groove and away from the hinged edge, of the abutment, and a fixed hole, through which the feed screw passes to be relatively fixedly connected to the rocker arm, is formed in the fixed block.

9. The inclining test equipment according to claim 4, wherein a fixed block is provided on a side, corresponding to the groove and away from the hinged edge, of the abutment, and a fixed hole, through which the feed screw passes to be relatively fixedly connected to the rocker arm, is formed in the fixed block.

10. The inclining test equipment according to claim 5, wherein a fixed block is provided on a side, corresponding to the groove and away from the hinged edge, of the abutment, and a fixed hole, through which the feed screw passes to be relatively fixedly connected to the rocker arm, is formed in the fixed block.

11. The inclining test equipment according to claim 6, wherein a fixed block is provided on a side, corresponding to the groove and away from the hinged edge, of the abutment, and a fixed hole, through which the feed screw passes to be relatively fixedly connected to the rocker arm, is formed in the fixed block.

12. The inclining test equipment according to claim 2, further comprising an angle indicating member comprising a plurality of angle scales arranged in parallel on a side of the groove; and a corresponding position of the pusher on the angle scales corresponds to an angle of inclination of the workbench relative to a plane of the abutment.

13. The inclining test equipment according to claim 3, further comprising an angle indicating member comprising a plurality of angle scales arranged in parallel on a side of the groove; and a corresponding position of the pusher on the angle scales corresponds to an angle of inclination of the workbench relative to a plane of the abutment.

14. The inclining test equipment according to claim 4, further comprising an angle indicating member comprising a plurality of angle scales arranged in parallel on a side of the groove; and a corresponding position of the pusher on the angle scales corresponds to an angle of inclination of the workbench relative to a plane of the abutment.

15. The inclining test equipment according to claim 5, further comprising an angle indicating member comprising a plurality of angle scales arranged in parallel on a side of the groove; and a corresponding position of the pusher on the angle scales corresponds to an angle of inclination of the workbench relative to a plane of the abutment.

16. The inclining test equipment according to claim 6, further comprising an angle indicating member comprising a plurality of angle scales arranged in parallel on a side of the groove; and a corresponding position of the pusher on the angle scales corresponds to an angle of inclination of the workbench relative to a plane of the abutment.

17. The inclining test equipment according to claim 12, wherein the plurality of angle scales have values ranging from 5° to 20°.

18. The inclining test equipment according to claim 13, wherein the plurality of angle scales have values ranging from 5° to 20°.

19. The inclining test equipment according to claim 14, wherein the plurality of angle scales have values ranging from 5° to 20°.

* * * * *